US010069673B2

(12) United States Patent
Hassink et al.

(10) Patent No.: US 10,069,673 B2
(45) Date of Patent: Sep. 4, 2018

(54) METHODS, SYSTEMS, AND COMPUTER READABLE MEDIA FOR CONDUCTING ADAPTIVE EVENT RATE MONITORING

(71) Applicant: Oracle International Corporation, Redwood Shores, CA (US)

(72) Inventors: Brian John Hassink, Cary, NC (US); Syed Mohsin Reza Zaidi, Cary, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 207 days.

(21) Appl. No.: 14/827,766

(22) Filed: Aug. 17, 2015

(65) Prior Publication Data

US 2017/0054624 A1   Feb. 23, 2017

(51) Int. Cl.
*H04L 12/26* (2006.01)
*H04L 12/24* (2006.01)

(52) U.S. Cl.
CPC ...... *H04L 41/0622* (2013.01); *H04L 43/0811* (2013.01)

(58) Field of Classification Search
None
See application file for complete search history.

(56) References Cited

U.S. PATENT DOCUMENTS

| 7,088,710 | B1 | 8/2006 | Johnson et al. |
| 7,617,285 | B1 | 11/2009 | Hartmann |
| 8,144,588 | B1 | 3/2012 | Ma |
| 8,194,548 | B2 | 6/2012 | Diab et al. |
| 8,615,217 | B2 | 12/2013 | Ravishankar et al. |
| 9,350,734 | B1 * | 5/2016 | Jamshidi ............. H04L 63/1458 |
| 9,391,208 | B2 * | 7/2016 | Yan ................... H01L 29/78606 |
| 9,432,305 | B1 * | 8/2016 | Das ..................... H04L 61/1511 |
| 9,515,932 | B2 | 12/2016 | Zaidi et al. |
| 2004/0136379 | A1 | 7/2004 | Liao et al. |
| 2005/0005021 | A1 | 1/2005 | Grant et al. |
| 2005/0100011 | A1 | 5/2005 | Chiruvolu et al. |
| 2007/0286202 | A1 | 12/2007 | Dos Remedios et al. |
| 2008/0028068 | A1 | 1/2008 | Nochta et al. |

(Continued)

OTHER PUBLICATIONS

F5 Networks, "F5 Traffix Signaling Delivery Controller", 2014, F5 Networks, pp. 1-11.*

(Continued)

*Primary Examiner* — Steve R Young
(74) *Attorney, Agent, or Firm* — Jenkins, Wilson, Taylor & Hunt, P.A.

(57) ABSTRACT

According to one aspect, the disclosed subject matter describes herein a method for conducting adaptive event rate monitoring, the method including detecting an occurrence of network events during a span of time defined by a convergence time period and incrementing a counter value for each of a plurality of monitoring segments included in the convergence time period based on when each of the network events are detected within the convergence time period. The method further includes determining a convergence time rate based on counter values associated with each of the monitoring segments included in the convergence time period and calculating an adaptive per-second event rate using the determined convergence time rate.

14 Claims, 3 Drawing Sheets

(56) References Cited

U.S. PATENT DOCUMENTS

| | | |
|---|---|---|
| 2008/0291927 A1 | 11/2008 | Yong et al. |
| 2009/0222573 A1 | 9/2009 | Grossner et al. |
| 2011/0040845 A1 | 2/2011 | Cai et al. |
| 2011/0055921 A1* | 3/2011 | Narayanaswamy ......... H04L 63/1458 726/22 |
| 2011/0158090 A1 | 6/2011 | Riley et al. |
| 2011/0176418 A1 | 7/2011 | Gershinsky et al. |
| 2012/0005367 A1 | 1/2012 | Bettink et al. |
| 2013/0039176 A1 | 2/2013 | Kanode et al. |
| 2013/0039179 A1 | 2/2013 | Chapman et al. |
| 2013/0275583 A1 | 10/2013 | Roach et al. |
| 2014/0198644 A1 | 7/2014 | Basilier et al. |
| 2015/0033255 A1* | 1/2015 | Neumann ......... H04N 21/25891 725/34 |
| 2015/0248462 A1* | 9/2015 | Theeten ............ G06F 17/30516 707/688 |
| 2016/0234119 A1 | 8/2016 | Zaidi et al. |

OTHER PUBLICATIONS

F5 Traffix Signaling Delivery Controller, Datasheet, http://www.f5.com/pdf/ products/signaling-delivery-controller-datasheet.pdf, pp. 1-11 (2014).

Diameter Solution SuiteTM—The Smarter Diameter Signaling Controller, Diametriq, http://diametriq.com/wp-content/uploads/downloads/2015/02/Diameter-Solution-Suite.pdf, pp. 1-4 (Feb. 2015).

Notice of Allowance and Fee(s) Due for U.S. Appl. No. 14/616,611 (dated Aug. 2, 2016).

Applicant-Initiated Interview Summary for U.S. Appl. No. 14/616,611 (dated Jun. 16, 2016).

Non-Final Office Action for U.S. Appl. No. 14/616,611 (dated Mar. 11, 2016).

Commonlu-assigned, co-pending U.S. Appl. No. 14/616,611 for "Methods, Systems, and Computer Readable Media for Conducting Priority and Compliance Based Message Traffic Shaping," (Unpublished, filed Feb. 6, 2015).

* cited by examiner

METHODS, SYSTEMS, AND COMPUTER READABLE MEDIA FOR CONDUCTING ADAPTIVE EVENT RATE MONITORING

TECHNICAL FIELD

The subject matter described herein relates to the monitoring and management of network events. More particularly, the subject matter described herein relates to systems, methods, and computer readable media for conducting adaptive event rate monitoring.

BACKGROUND

Message traffic rate solutions are currently utilized by network administrators in order to manage message bandwidth in an efficient manner as well as to protect network peer resources from congestion related failures. However, many traffic monitoring solutions that are currently deployed in networks do not consider the variability of the distribution of network events (e.g., connections established or messages received/sent). For example, various rate monitoring solutions used by system administrators typically involve the monotonic incrementing of a counter mechanism in response to an event occurrence. The counter value is subsequently utilized to report an event rate on a one second interval, where the event rate over the last second is determined to be the absolute difference between the start value and end value.

Accordingly, there exists a need for systems, methods, and computer readable media for conducting adaptive event rate monitoring.

SUMMARY

Methods, systems, and computer readable media for conducting adaptive event rate monitoring are disclosed. According to one aspect, the subject matter described herein comprises a method that includes detecting an occurrence of network events during a span of time defined by a convergence time period and incrementing a counter value for each of a plurality of monitoring segments included in the convergence time period based on when each of the network events are detected within the convergence time period. The method further includes determining a convergence time rate based on counter values associated with each of the monitoring segments included in the convergence time period and calculating an adaptive per-second event rate using the determined convergence time rate.

The subject matter described herein may be implemented in hardware, software, firmware, or any combination thereof. As such, the terms "function", "engine", or "module" as used herein refer to hardware, software and/or firmware components for implementing the feature(s) being described. In some embodiments, a function and/or module may comprise a chipset (e.g., a microprocessor) including a hardware processor unit that executes a software algorithm stored in embedded (non-transitory) memory. In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for conducting adaptive event rate monitoring. In some embodiments, the disclosed subject matter includes an event monitoring engine (EME) included in each of a plurality of message processors (e.g., processor cards). The event monitoring engine can be configured to receive and/or collect event occurrence data (e.g., instances of message traffic received/sent or instances of connection requests accepted over a period of time) to periodically calculate an adaptive per-second event rate that can be used to increase the accuracy and responsiveness of monitoring activities performed by a host network routing element.

In some embodiments, the event monitoring engine may be configured by a system administrator with a convergence time period that is less than or greater than one second. Notably, configuration of the convergence time period may be based on whether the event being monitored has a tendency to occur in a uniformly distributed manner or a non-uniformly distributed manner. Further, the convergence time period may be divided into monitoring segments (e.g., "sampling ticks") that can be used to categorize event occurrences into smaller subsections as well as to act as a trigger for periodically calculating the adaptive per-second event rate. As used herein, the monitoring segment is a designated time period smaller than one second that is used to monitor and record the occurrence of an event. Notably, the monitoring segment determines the frequency at which data is collected, thereby limiting the age and staleness of the "established per second rate". Notably, the smaller the monitoring segment, the more "precise" the measurements as well as the greater amount of processing resources consumed. If the convergence time period differs from one second, the resulting convergence time rate calculated by the event monitoring engine may be adjusted (e.g., extrapolated or averaged) to derive the adaptive per-second event rate. The adaptive per-second event rate may then be communicated to an event policing function (e.g., a traffic shaping engine, a traffic policing engine, a connection management engine, etc.) that is configured compare the adaptive per-second event rate with a defined event threshold rate value to determine if a remedial action is needed.

Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
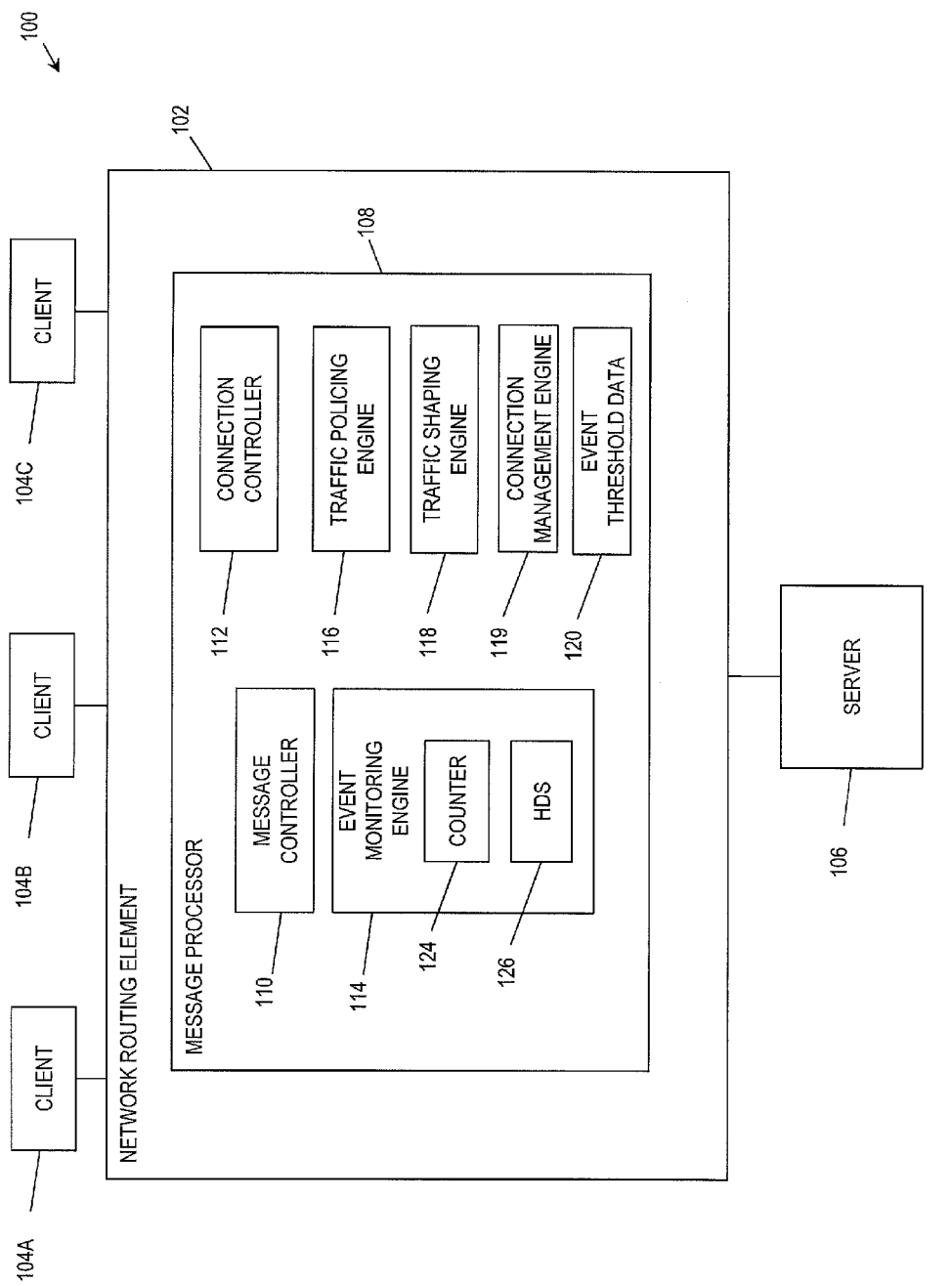
FIG. 1 is a block diagram illustrating a system for conducting adaptive event rate monitoring according to an embodiment of the subject matter described herein.

FIG. 1 is a block diagram illustrating an exemplary network system 100 that includes a network routing element 102 that facilitates network traffic communications between a plurality of client entities 104A-C and at least one server entity 106. Although FIG. 1 depicts three clients and a single server for the sake of simplicity and explanation, network routing element 102 may be configured to support additional client entities and server entities without departing from the scope of the disclosed subject matter. An example network element may include a Diameter signaling router (DSR) device, a SIP signaling router, or any like signaling router device. Similarly, example client entities and server entities may include mobility management entities (MMEs), policy and charging enforcement functions (PCEFs), home subscriber servers (HSSs), and policy control and charging rules functions (PCRFs). In some embodiments, network routing element 102 may include a messaging processor 108 that is configured to establish connection links and facilitate messaging communications (e.g., communicating message traffic including request messages, content response messages, etc.) among client entities 104A-C and server entity 106. Although only one message processor 108 is depicted in FIG. 1, additional message processor 108 may be utilized in a collective manner without departing from the scope of the disclosed subject matter. In some embodiments, one or more client entities 104 may send message traffic (e.g., Diameter request messages, RADIUS request messages, etc.) toward server entity 106 via network routing element 102. A message processor 108 in network routing element 102 may be configured to detect message traffic received from a client entity 104 and based on the detected rate of message traffic, conduct message control processing on the received message traffic prior to forwarding to server entity 106. In particular, network routing element 102 includes a message controller 110 that detects and monitors the message traffic (e.g., packet traffic and/or frame traffic) communicated between client entities 104A-C and server entity 106. Similarly, network routing element 102 may include a connection controller 112 that is configured to detect and monitor the acceptance and establishing of connection links with client entities 104A-C.

In some embodiments, message processor 108 may be configured to utilize message controller 110 to receive, detect, and/or aggregate message traffic sent to server entity 106 from client entities 104A-C. Message controller 110 may subsequently communicate the message receipt data to event monitoring engine 114, which may subsequently calculate an adaptive per-second event rate from an aggregated ingress message rate (e.g., a message rate that represents the amount of message traffic collectively received from client entities 104A-C over a common time period). Alternatively, event monitoring engine 114 may be configured to collect the message receipt data from message controller 110. In some embodiments, message controller 110 may be configured to aggregate or combine all of the message traffic that is being directed to server 106 from client entities 104A-C. The aggregated data may then be sent to or collected by event monitoring engine 114 on a periodic basis (e.g., triggered for every monitoring as described below). Similarly, message processor 108 may be configured to utilize connection controller 112 to receive, detect, and/or aggregate connection requests from client entities 104A-C. The connection request data may also be sent to or collected by event monitoring engine 114 on a periodic basis (e.g., triggered for every monitoring as described below).

In some embodiments, event monitoring engine 114 is configured to receive (or collect) and categorize event occurrence data (e.g., ingress messages received, connections accepted, etc.) as the data is received by message processor 108 (e.g., message controller 110 or connection controller 112) to determine an adaptive per-second event rate. Notably, event monitoring engine 114 utilizes a predefined convergence time period to derive the adaptive per-second event rate. In some embodiments, a system administrator establishes a convergence time period by defining the period's duration. For example, a system administrator may define a convergence time period to be less than 1 second (e.g., 0.5 seconds) if the network event being monitored usually exhibits a uniform distribution. Conversely, a system administrator may define a convergence time period to be more than 1 second (e.g., 2 seconds) if the network event being monitored usually exhibits a non-uniform distribution. In addition to defining a convergence time period, a system administrator may also establish the associated monitoring segments (e.g., sampling ticks) that make up the convergence time period. A monitoring segment may include any value that is both smaller than one second and divisible (e.g., 50 milliseconds) into the convergence time period. Notably, the duration/size of the monitoring segment may be selected based on how sensitive (or insensitive) the system administrator wants the event monitoring engine 114 to be based on the variability exhibited in the data. Specifically, the smaller the duration/size of the monitoring segment, the more responsive event monitoring engine 114 will be. However, as the duration/size of the monitoring segment decreases, the amount of computing resources required by event monitoring engine 114 increases. Specifically, the monitoring segment functioning as a trigger to calculate the convergence time rate will occur with greater frequency. In some alternate embodiments, the convergence time period may be dynamically determined and/or adjusted by event monitoring engine 114 based on a variance among the counter values in the monitoring segments over a defined duration of time.

After being configured with a defined convergence time period and a monitoring segment size, event monitoring engine 114 may begin collecting and recording the detected occurrence of events (e.g., messages received by message controller 110 and/or connections accepted by connection controller 112). As the occurrence of events are detected, event monitoring engine 114 utilizes a counter 124 and a historic data store 126 to record the number of occurring events. Specifically, event monitoring engine 114 uses counter 124 to keep an account of all events occurring in the time period defined by each monitoring segment of the convergence time period. After a monitoring segment (e.g., 50 ms interval) expires, event monitoring engine 114 begins an accounting of events for the next subsequent monitoring segment. Event monitoring engine 114 is able to store the event count information associated with each convergence time period in historic data store 126, which may include a number of database tables. After recording the event count information for a convergence time period, event monitoring engine 114 may calculate a convergence time rate which in some embodiments includes summing the count values in each of the monitoring segments contained in a convergence time period "window" (e.g., a specific convergence time period that includes the current monitoring segment and a defined number of previous/historic monitoring segments) and dividing the total sum by the duration of the convergence time period. Afterwards, event monitoring engine 114 may be configured to derive an adaptive per second event rate by calibrating (e.g., via averaging or extrapolation) the calculated convergence time rate to a rate that is based on one second (i.e., a "per-second rate"). Additional details regarding the manner of recording the event occurrences and calculating the convergence time period is shown in and described below with respect to FIG. 2.

In some embodiments, event monitoring engine 114 can be configured to calculate the adaptive per second event rate after the processing of each monitoring segment (e.g., every 50 ms). In particular, event monitoring engine 114 is able to generate an adaptive per second event rate more frequently than a one second monitoring rate typically utilized in network systems. After each instance in which the adaptive per second event rate is calculated, event monitoring engine 114 may forward the derived rate to an appropriate event policing engine based on the type of network event being monitored. For example, if the amount of ingress traffic received by network routing element 102 is being monitored, event monitoring engine 114 may forward an adaptive per second ingress traffic rate to traffic policing engine 116. Similarly, if the amount of egress traffic sent by network routing element 102 is being monitored, event monitoring engine 114 may forward an adaptive per second egress traffic rate to traffic shaping engine 118. Likewise, if the number of connections accepted by network routing element 102 is being monitored, event monitoring engine 114 may forward an adaptive per second connection acceptance rate to a connection management engine 119.

Upon receiving the adaptive per second event rate from event monitoring engine 114, an event policing engine may be configured to query or access event threshold data store 120 to obtain appropriate event threshold data. In some embodiments, message processors 108 may include a event threshold data store 120 that is configured to contain certain operational parameter data associated to each of a plurality of server entities (e.g., server entity 106) serviced by network routing element 102 as well as certain operational parameters data associated with the host network routing element (e.g., network routing element 102 and/or message processor 108).

For example, event threshold data store 120 may include a database that maps identifiers corresponding to the server entities and respective event threshold rate values, such as message processing capacity threshold rate values (e.g., target rate values that represent the maximum message processing capacity rates handled by each server entity and/or the host network routing element) or connection acceptance rate threshold rate values (e.g., rate values that represent the maximum connection rates handled by the network routing element).

In some embodiments, the message processing threshold rate values stored in event threshold data store 120 may include either static values or variable values that adjust based on one or more dynamic conditions. For example, dynamic conditions may include, but not limited to, pending transactions, communication failures, destination server feedback, and the like. Notably, each of these dynamic conditions (or combinations thereof) would result in some variation to an egress message threshold rate value associated with a destination server entity, such as upwards or downwards throttling in order to maintain an equilibrium state with respect to pending transactions.

Once the event threshold data is obtained from event threshold data store 120, the event policing engine may contrast the event threshold data with the adaptive per second event rate derived by event monitoring engine 114. For example, traffic shaping engine 118 may subsequently compare an adaptive per-second egress message rate and the obtained message processing capacity threshold value associated with server entity 106 to determine if server entity 106 is susceptible to becoming overloaded. If the adaptive per-second egress message rate does not exceed the capacity threshold rate value, then message controller 110 may be instructed by traffic shaping engine 118 to forward all of the message traffic directed to server entity 106 to the intended destination. However, if the adaptive per-second egress message rate exceeds the threshold rate value, then traffic shaping engine 118 may be configured to initiate a defined remedial action. For example, traffic shaping engine 118 may obtain and forward an appropriate traffic shaping profile to message controller 110. As used herein, traffic shaping refers to the reduction (e.g., discarding and/or rerouting) of packet message traffic processed by a message controller 110 on message processor 108. Upon receipt of the traffic shaping profile from traffic shaping engine 118, message controller 110 may execute a traffic shaping procedure in accordance to the received traffic shaping profile. In some embodiments, message controller 110 may classify/categorize the message traffic received by one or more of client entities 104A-C and selectively determine which messages are processed and subsequently sent to server entity 106. In some embodiments, message controller 110 may also adjust the rate of outgoing message traffic directed to target server entity 106.

In some embodiments, the traffic shaping profile may be provisioned in event threshold data store 120 by an operations, administration, and maintenance (OAM) component that is responsible for providing the traffic shaping profile (i.e., static configuration information which may include a traffic shaping policy, client compliance limits, message priority designations, and the like. Alternatively, message processor 108 may be configured to query and access a separate and/or dedicated OAM server entity to acquire the traffic shaping profile to be implemented by traffic shaping engine 118 and/or message controller 110. In some embodiments, OAM server entity may serve as a persistent central storage that may be accessed and/or interfaced by a system administrator (e.g., via a command line interface (CLI) or a graphical user interface (GUI)). Further, the system administrator may validate and store the static configuration data in the OAM server entity.

In some embodiments, an adaptive per second ingress message rate may be used to protect host resources at message processor 108 from being overwhelmed by a specific client entity. For example, the adaptive per second ingress message rate may be used as an input at a traffic policing function 116. Notably, traffic policing engine 116 may be configured to selectively shed message traffic to achieve a configured target incoming message rate. For example, suppose traffic policing engine 116 utilized an ingress threshold rate value of 500 mps (e.g., obtained from data store 120). Should client entity 104A send message traffic at a rate that exceeds the committed rate of 500 mps, then traffic policing engine 116 may designate client entity 104A as a "non-compliant client" and may classify its received message traffic as "non-compliant." In some embodiments, traffic policing engine 116 may "color" the message traffic from a non-compliant client as "yellow". Conversely, if the 500 mps threshold rate value of 500 mps is not met or exceeded, traffic policing engine 116 may deem the message traffic as "compliant" and color the compliant message traffic as "green". In some embodiments, an adaptive per second connection acceptance rate may be used to protect host resources at message processor 108 from being overwhelmed by a client entities requesting new connection. For example, the adaptive per second connection acceptance rate may be used as an input at a connection management engine 119. Notably, connection management engine 119 may be configured to selectively reject or drop new connection requests if the per second rate exceeds a configured connection target rate. For example, suppose connection management engine 119 utilized a connection acceptance threshold rate value of 50 connections per second (e.g., value obtained from data store 120). Should client entities 104A-C send connection request messages at a rate that exceeds the predefined rate of 75 connections per second, then connection management engine 119 may begin rejecting and/or dropping newly received connection requests.

In some embodiments, the decision to discard message traffic (as well as the extent/amount of message traffic to discard) may be driven by scenarios in which one or more message processors in network routing element 102 experience an overload condition. Notably, if a message processor is experiencing a CPU overload condition, message traffic may be discarded by the message processor in accordance to a remedial action. For example, all message traffic in excess of the engineered capacity (as specified by the threshold rate value) of network routing element 102 may be discarded if network routing element 102 goes into CPU congestion (e.g., a predefined level/percentage of CPU utilization). Accordingly, the disclosed subject matter can be utilized for self-protection purposes in a manner similar to the peer overload protection.

In some alternate embodiments, a traffic shaping profile may specify that a message processor 108 never discards any answer or response messages. Notably, it may be preferable for answer messages and response messages to be passed through unaffected so that transaction in progress may complete even if new request messages have to be dropped. Thus, the answer messages will still consume capacity (and affect other traffic and traffic rates) but not be discarded. However, the number of answer messages will be controlled by the reduction in the number of request messages that may trigger a respective number of answer messages. In some alternate embodiments, first responder traffic (e.g., both Diameter request messages and corresponding answer messages associated with first responder emergency entities, such as police, firefighters, emergency medical technicians, disaster relief personnel, etc.) may be passed through unaffected in accordance to the traffic shaping profile. However, in order to protect the message processors 108 of network routing element 102 from overload conditions from excess message traffic, the traffic shaping profile may indicate that only a designated percentage of message traffic may be passed through in this manner. Additionally, message controller 110 may be configured (per the traffic shaping profile utilized by traffic shaping engine 118) to de-prioritize other message traffic, such as regular message requests and corresponding answer messages.

In addition, although the following disclosure related to FIG. 1. describes a single message processor 108, the disclosed subject matter includes a degree of scalability that affords multiple embodiments. For example, in some embodiments, multiple message processors 108 may reside in a separate and distinct network routing element (e.g., separate Diameter signaling routers) that are communicatively connected and coordinated via wired and/or wireless network connections. In some alternate embodiments, processor 108 may include one or more ingress functions and one or more egress functions that may respectively handle the monitoring and managing of ingress and egress message traffic. In some alternate embodiments, the message processors may be distributed across (i.e., reside on) multiple coordinating DSRs. For example, a first message processor and second message processor may belong to a first DSR and operate as ingress functions that are connected to client entities and a third message processor may be located in a second DSR. Notably, the third message processor on the second DSR may operate as an egress function that is connected to a server entity. In some embodiments, the disclosed subject matter can be simultaneously deployed at a plurality of the abovementioned levels and/or layers.

Although not shown, network routing element 102 comprises a processor, a memory, a storage device, each of which are communicatively connected via a system bus. In some embodiments, the processor can comprise a microprocessor, central processing unit (CPU), or any other like hardware based processing unit. In some embodiments, each of message controller 110, connection controller 112, event monitoring engine 114, traffic policing engine 116, traffic shaping engine 118, and connection management engine 119 can be stored in memory, which can comprise random access memory (RAM), read only memory (ROM), optical read/write memory, cache memory, magnetic read/write memory, flash memory, embedded memory, or any other like non-transitory computer readable medium. In some embodiments, the processor and memory can be used to execute and manage the operation of controller 110-112 and engines 114-119. In some embodiments, the storage device can comprise any storage medium or storage unit that is configured to store data accessible by the processor via the system bus. Exemplary storage devices can comprise one or more local databases hosted by network routing element 102.

It should be noted that network routing element 102 and its components (e.g., message processor(s), ingress function(s), egress function(s), etc.) described herein constitute a special purpose computing device and/or machine that performs adaptive event rate monitoring. For example, network routing element 102 can be configured to improve the technological field of network communication management by providing a unique mechanism that customizes the monitoring of various network events, such as the receiving and sending of messages (e.g., signaling or content packet traffic) or the receiving of connection link requests. Further, the architecture depicted in FIG. 1 facilitates the generation of a customized event "per second" rate that can be applied to the threshold monitoring functionality of a system, thereby improving the efficiency and accuracy of various system tasks, such as congestion control (e.g., maximum rates for ingress/egress traffic and connection link acceptance), overload control (e.g., CPU thresholds), message priority-based control, and the like.

Figure 2:
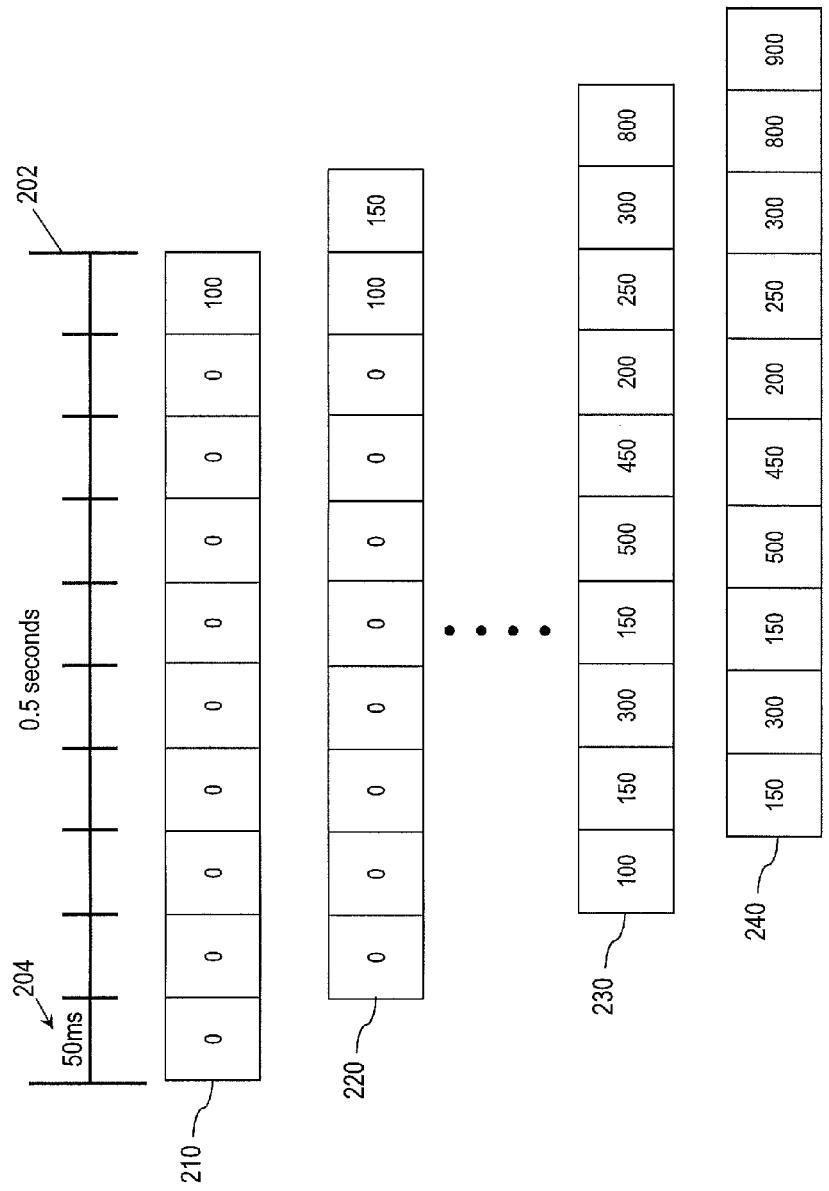
FIG. 2 is a block diagram illustrating the utilization of example convergence time periods according to an embodiment of the subject matter described herein.

FIG. 2 is a block diagram illustrating the utilization of exemplary convergence time period windows according to an embodiment of the subject matter described herein. Using the components included in FIG. 1 as an illustrated example, event monitoring engine 114 may be configured by a system administrator that establishes a convergence time period and include monitoring segments to monitor egress message traffic. For example, as shown in FIG. 2, a system administrator may define a convergence time period of 0.5 seconds that comprises ten monitoring segments, each of which comprises 50 ms (e.g., see monitoring segment 204). As indicated above, convergence time period 202 may be based on whether the monitored network events (e.g., received ingress messages, sent egress messages, accepted connection requests, etc.) are typically detected by network routing element 102 in a non-uniform distributed manner or in a uniform distributed manner. Similarly, monitoring segment 204 may be defined based on the amount of sensitivity required and/or the amount of computing resources to be assigned to the event monitoring task.

After event monitoring engine 114 is provisioned with convergence time period 202 and monitoring segment 204, event monitoring engine 114 maybe configured to begin detecting the occurrence of the events. For the sake of illustration, the following event monitoring scenario will pertain to the receiving of ingress message traffic at message controller 110 in network routing element 102 (shown in FIG. 1). For example, message controller 110 begins receiving message traffic and reporting the occurrences to event monitoring engine 114. Alternatively, event monitoring engine 114 may be configured to collect data representing the occurrence of received messages from message controller 110 on a periodic basis. For example, if 100 messages were received in a first 50 ms monitoring segment (e.g., event monitoring engine 114 may utilize a clock mechanism to keep track of elapsed time), event monitoring engine 114 may be configured to increment counter 124 for each of the 100 received messages during the first 50 ms interval. The 100 message count value is then recorded as shown in the rightmost block of convergence time period window 210. As time elapses (e.g., 50 ms elapsed), convergence time period 202 "moves" to the right and a new convergence time period window (e.g., convergence time period window 220) is defined. Notably, convergence time period 220 depicts that the monitoring segment containing the 100 message count value "moves" to the left such that counter 124 records that 150 additional messages have been received in the following 50 ms monitoring segment.

After a period of time (e.g., 0.4 seconds), all of the monitoring segments of convergence time period window 230 have filled up such that the initial recorded value is now presently in the leftmost monitoring segment of convergence time period window 230. At the end of any of the monitoring segment periods, event monitoring engine 114 may be triggered (e.g., by the elapsed time period) to calculate an adaptive per second event rate. In some embodiments, event monitoring engine 114 may add all of the recorded values in the monitoring segments of the convergence time period and divide the sum by the convergence time period duration. Using time convergence time period window 230 in FIG. 2 as an example, the convergence time rate maybe calculated as being equal to 3200 messages per 0.5 seconds.

Next, the convergence time rate may be adjusted by event monitoring engine 114 to derive the adaptive per second ingress message rate. In this example, a convergence time rate of 3200 messages/0.5 seconds is calculated to be an adaptive per second ingress message rate equal to 6400 messages per second. As previously indicated, event monitoring engine 114 may be configured to calculate the adaptive per second ingress message rate every time a monitoring segment expires (e.g., every 50 ms in this example). Continuing with the example of FIG. 2, convergence time period window 240 depicts a convergence time period that has been progressed 50 ms. Event monitoring engine 114 may then calculate the convergence rate by summing the values in the monitoring segment in the current convergence time period to derive an adaptive per second contingent rate of 8000 messages per second (e.g., 4000 messages/0.5 seconds=8000 mps).

Notably, event monitoring engine 114 may be configured able to calculate an updated adaptive per second ingress message rate every 50 ms as opposed to making a calculation every one second. By doing so, event monitoring engine 114 is able to send a calculated adaptive per second ingress message rate to an event policing function, such as traffic policing engine 116, traffic shaping engine 118, or connection management engine 119, on a more frequent basis. By increasing this frequency, message processor 108 is able to obtain monitoring results that are more realistic and representative of the events occurring at network routing element 102. For example, traffic policing engine 116 is able to receive the adaptive per second ingress message rate from event monitoring engine 114 every 50 ms and subsequently compare this rate with a stored ingress message threshold rate value (e.g., 700 messages per second). Accordingly, traffic policing engine 116 will be more responsive to adverse or overload conditions by being able to detect that the adaptive per second ingress message rate exceeds the threshold rate value and, in response, immediately initiate a remedial action.

In some embodiments, event monitoring engine 114 may be configured to record an ongoing cumulative number of messages received or sent by message controller 110 (or an ongoing cumulative number of connection requests received by connection controller 112) in each monitoring segment. In such embodiments, event monitoring engine 114 calculates the convergence time rate by subtracting the message count value (or connection acceptance count value) contained in the first (i.e., leftmost) monitoring segment of the convergence time period window from the last (i.e., the rightmost) and most recent message count value. This calculated difference is then divided by the convergence time period duration similar to the manner described above to obtain the convergence time rate. Afterwards, event monitoring engine 114 may adjust the convergence time rate, if necessary (e.g., extrapolating if the convergence time period was less than one second or averaging if the convergence time was greater than one second) to derive the adaptive per second event rate. It should be noted that while this "cumulative event accounting" method will achieve the same result as the method described above, it may be more computationally efficient in some scenarios.

Figure 3:
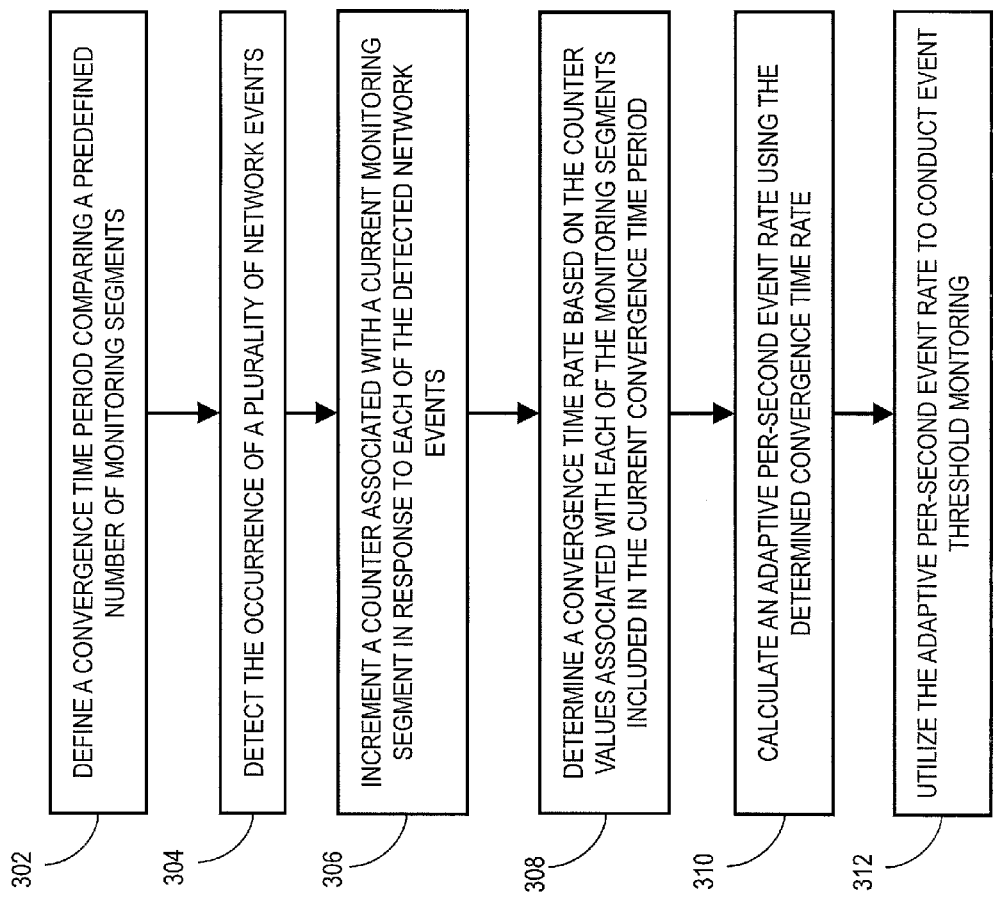
FIG. 3 is a flow chart illustrating an exemplary process for conducting adaptive event rate monitoring according to an embodiment of the subject matter described herein.

FIG. 3 illustrates a method 300 for conducting adaptive event rate monitoring in accordance with embodiments of the subject matter described herein. The following method is also described with respect to system 100 in FIG. 1 as an exemplary embodiment.

In step 302, a convergence time period containing a plurality of monitoring segments is defined. In some embodiments, a system administrator may establish the convergence time period (e.g., one second, greater than one second, or less than one second) as well the duration of the monitoring segments ("sampling ticks") included in the convergence time period. For example, the convergence time period may comprise a duration of 500 milliseconds. Further, the system administrator may configure the convergence time period to be composed of 10 monitoring segments, each of which is 50 milliseconds in duration.

In step 304, the occurrence of a plurality of network events is detected. In some embodiments, an event monitoring engine 114 may detect that message controller 110 receives message traffic, such as Diameter request messages, directed toward server entity 106 from one or more client entities 104A-C. In other embodiments, event monitoring engine 114 may detect that connection controller 112 receives connection requests from one or more client entities 104A-C. In yet another embodiment, event monitoring engine 114 may detect that message controller 110 has aggregated and forwarded message traffic from a plurality of client entities 104A-C to server entity 106.

In step 306, a counter value for each of the monitoring segments included in a convergence time period is incremented. In some embodiments, a counter value corresponding to a current monitoring segment is incremented in response to each of the detected network events. In some embodiments, EME 114 is configured to record and account for each instance of an event (e.g., receiving a message, a connection request, etc.) occurring during a time period defined by the current monitoring segment (e.g., an interval spanning 0 to 50 ms). After the current monitoring segment time period expires, event monitoring engine 114 may be configured to continue recording subsequent instances of events in a new monitoring segment.

In step 308, a convergence time rate based on the counter values associated with each of the monitoring segments included in the current convergence time period is determined. In some embodiments, event monitoring engine 114 calculates a convergence time rate using the counter values in the monitoring segments. For example, event monitoring engine 114 can be configured to add all of the message count values contained in the monitoring segments of the current convergence time period window. EME 114 may then divide the total sum of message counts by the convergence time period to calculate the convergence time rate.

In block 310, an adaptive per-second event rate is calculated using the determined convergence time rate. In some embodiments, event monitoring engine 114 is configured to use the convergence time rate to derive and adaptive per-second event rate. For example, if the convergence time period is less than one second, then the convergence time rate may be extrapolated to a one second rate by event monitoring engine 114. Conversely, if the convergence time period is more than one second, then the convergence time rate may be averaged to a one second rate by event monitoring engine 114. Likewise, event monitoring engine 114 does not need to conduct any compatibility scaling if the convergence time period originally amounted to one second. Notably, event monitoring engine 114 may be configured to utilize the monitoring segments as a trigger to periodically derive the adaptive per second event rate.

In block 312, the calculated per-second event rate is utilized to conduct event threshold monitoring. In some embodiments, event monitoring engine 114 may be configured to send the calculated per-second event rate to an event policing engine, such as traffic policing engine 116, traffic shaping engine 118, connection management engine 119, or any other supporting event monitoring engine. For example, traffic policing engine 116 may obtain a predefined ingress message threshold value that establishes a threshold ingress message limit that can be processed by network routing element 102.

It will also be appreciated that exemplary method 300 is for illustrative purposes and that different and/or additional actions may be used. It will also be appreciated that various actions described herein may occur in a different order or sequence.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for conducting adaptive event rate monitoring, the method comprising:
   detecting, by a network routing element, an occurrence of network events during a span of time defined by a convergence time period window that comprises a set number of monitoring segments, wherein each of the set number of monitoring segments includes a defined duration of time;
   incrementing, for each of the monitoring segments, a counter value that records the number of network events detected within the defined duration of time of the monitoring segment;
   after an expiration of each of the monitored segments, determining a convergence time rate based on dividing a sum of the counter values associated with the monitoring segments included in the convergence time period window by the span of time defined by the convergence time period window and progressing the convergence time period window by the defined duration of time in order to establish a new convergence time period window that includes a most recent set number of monitoring segments;
   calculating an adaptive per-second event rate using the determined convergence time rate for the convergence time period window and each subsequent new convergence time period window after each of the monitored segments expires, wherein the convergence time period window is dynamically determined based on a variance among the counter values in the monitoring segments over the defined duration of time; and
   executing, by the network routing element, a remedial action in the event the adaptive per-second event rate equals or exceeds an event threshold rate value.

2. The method of claim 1 wherein calculating the adaptive per-second event rate includes averaging the convergence time rate to calculate the adaptive per-second event rate if the convergence time period is greater than one second in duration.

3. The method of claim 1 wherein calculating the adaptive per-second event rate includes extrapolating the convergence time rate to calculate the adaptive per-second event rate if the convergence time period is less than one second in duration.

4. The method of claim 1 wherein the network event includes at least one of receiving a connection request, receiving an ingress message, or sending an egress message.

5. The method of claim 1 wherein the adaptive per-second event rate is calculated by a message processor in a Diameter signaling router (DSR).

6. A system for conducting adaptive event rate monitoring, the system comprising:
   a network routing element that includes a processor and a memory;
   an event monitoring engine stored in the memory that is configured, when executed by the processor, to:
   detect an occurrence of network events during a span of time defined by a convergence time period window that comprises a set number of monitoring segments, wherein each of the set number of monitoring segments includes a defined duration of time;
   increment, for each of the monitoring segments, a counter value that records the number of network events detected within the defined duration of time of the monitoring segment;
   after an expiration of each of the monitored segments, determine a convergence time rate based on dividing a sum of the counter values associated with each of the monitoring segments included in the convergence time period window by the span of time defined by the convergence time period window and progressing the convergence time period window by the defined duration of time in order to establish a new convergence time period window that includes a most recent set number of monitoring segments; and calculate an adaptive per-second event rate using the determined convergence time rate for the convergence time period window and each subsequent new convergence time period window after each of the monitored segments expires, wherein the convergence time period window is dynamically determined based on a variance among the counter values in the monitoring segments over the defined duration of time; and an event policing engine stored in the memory that is configured, when executed by the processor, to execute a remedial action in the event the adaptive per-second event rate equals or exceeds an event threshold rate value.

7. The system of claim 6 wherein the event monitoring engine is further configured to average the convergence time rate to calculate the adaptive per-second event rate if the convergence time period is greater than one second in duration.

8. The system of claim 6 wherein the event monitoring engine is further configured to extrapolate the convergence time rate to calculate the adaptive per-second event rate if the convergence time period is less than one second in duration.

9. The system of claim 6 wherein the network event includes at least one of receiving a connection request, receiving an ingress message, or sending an egress message.

10. The system of claim 6 wherein the adaptive per-second event rate is calculated by a message processor in a Diameter signaling router (DSR).

11. A non-transitory computer readable medium having stored thereon executable instructions that when executed by a processor of a computer cause the computer to perform steps comprising:

detecting, by a network routing element, an occurrence of network events during a span of time defined by a convergence time period window that comprises a set number of monitoring segments, wherein each of the set number of monitoring segments includes a defined duration of time;

incrementing, for each of the monitoring segments, a counter value that records the number of network events detected within the defined duration of time of the monitoring segment;

after an expiration of each of the monitored segments, determining a convergence time rate based on dividing a sum of the counter values associated with the monitoring segments included in the convergence time period window by the span of time defined by the convergence time period window and progressing the convergence time period window by the defined duration of time in order to establish a new convergence time period window that includes a most recent set number of monitoring segments;

calculating an adaptive per-second event rate using the determined convergence time rate for the convergence time period window and each subsequent new convergence time period window after each of the monitored segments expires, wherein the convergence time period window is dynamically determined based on a variance among the counter values in the monitoring segments over the defined duration of time; and executing a remedial action in the event the adaptive per-second event rate equals or exceeds an event threshold rate value.

12. The computer readable medium of claim 11 wherein calculating the adaptive per-second event rate includes averaging the convergence time rate to calculate the adaptive per-second event rate if the convergence time period is greater than one second in duration.

13. The computer readable medium of claim 11 wherein calculating the adaptive per-second event rate includes extrapolating the convergence time rate to calculate the adaptive per-second event rate if the convergence time period is less than one second in duration.

14. The computer readable medium of claim 11 wherein the network event includes at least one of receiving a connection request, receiving an ingress message, or sending an egress message.

* * * * *

UNITED STATES PATENT AND TRADEMARK OFFICE
CERTIFICATE OF CORRECTION

PATENT NO. : 10,069,673 B2
APPLICATION NO. : 14/827766
DATED : September 4, 2018
INVENTOR(S) : Hassink et al.

Page 1 of 1

It is certified that error appears in the above-identified patent and that said Letters Patent is hereby corrected as shown below:

On the Title Page

On page 2, Column 2, under Other Publications, Line 14, delete "Commonlu" and insert -- Commonly --, therefor.

In the Drawings

On sheet 3 of 3, in FIG. 3, under Reference Numeral 312, Line 2, delete "MONTORING" and insert -- MONITORING --, therefor.

Signed and Sealed this
Tenth Day of September, 2019

Andrei Iancu
*Director of the United States Patent and Trademark Office*